United States Patent
Zou et al.

(10) Patent No.: US 11,173,987 B2
(45) Date of Patent: Nov. 16, 2021

(54) OFFSHORE FLOATING STRUCTURES

(71) Applicant: Atkins Energy, Inc., Columbia, SC (US)

(72) Inventors: Jun Zou, Houston, TX (US); Ikpoto Udoh, Houston, TX (US)

(73) Assignee: Atkins Energy, Inc., Columbia, SC (US)

( * ) Notice: Subject to any disclaimer, the term of this patent is extended or adjusted under 35 U.S.C. 154(b) by 615 days.

(21) Appl. No.: 15/385,286

(22) Filed: Dec. 20, 2016

(65) Prior Publication Data

US 2018/0105235 A1    Apr. 19, 2018

Related U.S. Application Data

(60) Provisional application No. 62/409,437, filed on Oct. 18, 2016.

(51) Int. Cl.
   *B63B 35/44*    (2006.01)
   *B63B 21/08*    (2006.01)
   (Continued)

(52) U.S. Cl.
   CPC .............. *B63B 35/44* (2013.01); *B63B 1/107* (2013.01); *B63B 1/125* (2013.01); *B63B 3/14* (2013.01);
   (Continued)

(58) Field of Classification Search
   CPC ..................................................... B63B 35/44
   See application file for complete search history.

(56) References Cited

U.S. PATENT DOCUMENTS

| 2,581,098 A | 7/1949 | Guenzel |
| 2,838,915 A * | 6/1958 | Roussel ................ E02B 17/021 |
| | | 405/196 |

(Continued)

FOREIGN PATENT DOCUMENTS

| CN | 102700688 B | 11/2014 |
| CN | 204436705 U | 7/2015 |

(Continued)

OTHER PUBLICATIONS

International Search Report and Written Opinion for PCT International Application No. PCT/US2017/057043, dated Feb. 14, 2018 (10 pp.).

(Continued)

*Primary Examiner* — S. Joseph Morano
*Assistant Examiner* — Jovon E Hayes
(74) *Attorney, Agent, or Firm* — Norton Rose Fulbright US LLP

(57) ABSTRACT

An offshore floating structure such as a wind turbine includes a number of improvements. The floating structure can include a chain engaging system configured to prevent any lengthwise movement of a mooring chain. The floating structure can also include a mooring fixture pivotally coupled to the hull to prevent shock loads from being transmitted directly from the mooring line to the hull. The floating structure can also include installation aid structures that provide additional water plane area and/or buoyancy to the structure. The floating structure can also have a hull that is optimized for use as an offshore wind turbine.

14 Claims, 10 Drawing Sheets

(51) Int. Cl.
 *B63B 1/12* (2006.01)
 *B63B 1/10* (2006.01)
 *F03D 13/25* (2016.01)
 *B63B 3/14* (2006.01)
 *B63B 21/20* (2006.01)
 *B63B 21/50* (2006.01)
 *B63B 35/38* (2006.01)

(52) U.S. Cl.
 CPC .............. *B63B 21/08* (2013.01); *B63B 21/20* (2013.01); *B63B 21/50* (2013.01); *B63B 35/38* (2013.01); *F03D 13/25* (2016.05); *B63B 2021/505* (2013.01); *B63B 2035/446* (2013.01); *F05B 2240/93* (2013.01); *Y02E 10/727* (2013.01)

(56) References Cited

U.S. PATENT DOCUMENTS

| | | | | |
|---|---|---|---|---|
| 4,432,735 | A * | 2/1984 | David | B63B 34/00 440/21 |
| 4,476,801 | A * | 10/1984 | Foster | B63B 21/50 114/230.23 |
| 4,878,452 | A | 11/1989 | Regan et al. | |
| 5,845,893 | A * | 12/1998 | Groves | B63B 21/10 254/389 |
| 5,984,586 | A * | 11/1999 | Wudtke | B63B 21/16 405/224 |
| 6,503,023 | B2 | 1/2003 | Huang et al. | |
| 6,983,714 | B2 * | 1/2006 | Dove | B63B 21/04 114/230.2 |
| 8,729,723 | B2 | 5/2014 | Boureau et al. | |
| 8,893,636 | B2 * | 11/2014 | Tomas | B63B 21/04 114/200 |
| 9,266,703 | B2 * | 2/2016 | Farrell, III | B66D 3/006 |
| 9,630,681 | B2 * | 4/2017 | Zijlmans | B63B 21/18 |
| 2002/0176747 | A1 * | 11/2002 | Hanna | B63B 21/502 405/224 |
| 2002/0189522 | A1 | 12/2002 | Dove et al. | |
| 2004/0190999 | A1 * | 9/2004 | Wybro | B63B 35/4413 405/203 |
| 2010/0024706 | A1 * | 2/2010 | Foo | B63B 21/50 114/264 |
| 2011/0037264 | A1 * | 2/2011 | Roddier | F03D 9/25 290/44 |
| 2011/0179986 | A1 * | 7/2011 | Nielsen | B63B 21/00 114/121 |
| 2012/0111255 | A1 * | 5/2012 | Fenini | B63B 21/16 114/230.22 |
| 2012/0266800 | A1 * | 10/2012 | Edelson | B63B 21/50 114/230.2 |
| 2012/0272888 | A1 * | 11/2012 | Luo | B63B 35/4406 114/285 |
| 2013/0000540 | A1 * | 1/2013 | Rijken | B63B 21/502 114/265 |
| 2013/0043447 | A1 | 2/2013 | Farrell | |
| 2013/0233231 | A1 * | 9/2013 | Dagher | F03D 13/25 114/265 |
| 2013/0298815 | A1 * | 11/2013 | Bussemaker | B63B 35/44 114/121 |
| 2013/0312649 | A1 | 11/2013 | Tomas | |
| 2014/0205383 | A1 * | 7/2014 | Noble | E02B 17/0021 405/196 |
| 2014/0224163 | A1 | 8/2014 | Zijlmans et al. | |
| 2015/0000581 | A1 * | 1/2015 | Mol | B63B 21/50 114/230.23 |
| 2015/0252791 | A1 * | 9/2015 | Taub | B63B 35/003 405/205 |
| 2015/0259042 | A1 * | 9/2015 | Vlasblom | B63B 21/50 405/224 |
| 2018/0105235 | A1 * | 4/2018 | Zou | B63B 35/44 |

FOREIGN PATENT DOCUMENTS

| | | | | |
|---|---|---|---|---|
| EP | | 1101935 | A2 | 5/2001 |
| NL | | 9300622 | A | 1/2000 |
| WO | WO-1999/043956 | A1 | | 9/1999 |
| WO | WO-2011/005101 | A1 | | 1/2011 |
| WO | WO-2011/137903 | A2 | | 11/2011 |
| WO | WO-2011137903 | A2 * | 11/2011 | ............ B63B 1/107 |
| WO | WO-2012/121607 | A1 | | 9/2012 |

OTHER PUBLICATIONS

International Search Report and Written Opinion Issued in PCT Application No. PCT/US2017/057043, dated Feb. 14, 2018.

\* cited by examiner

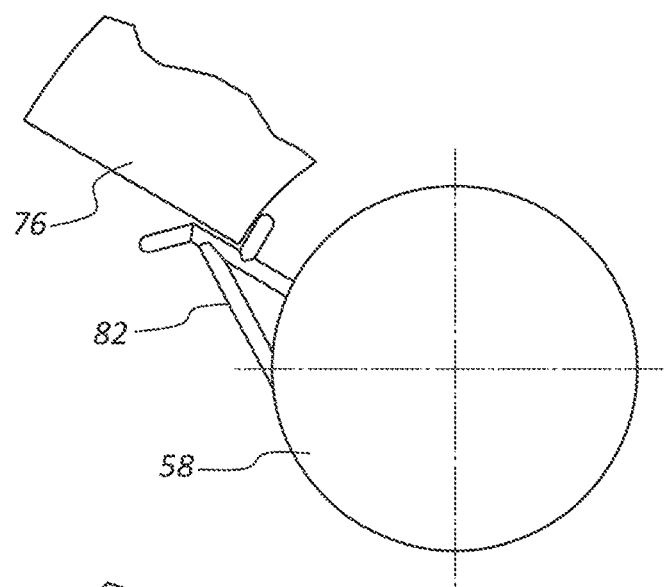
FIG. 15
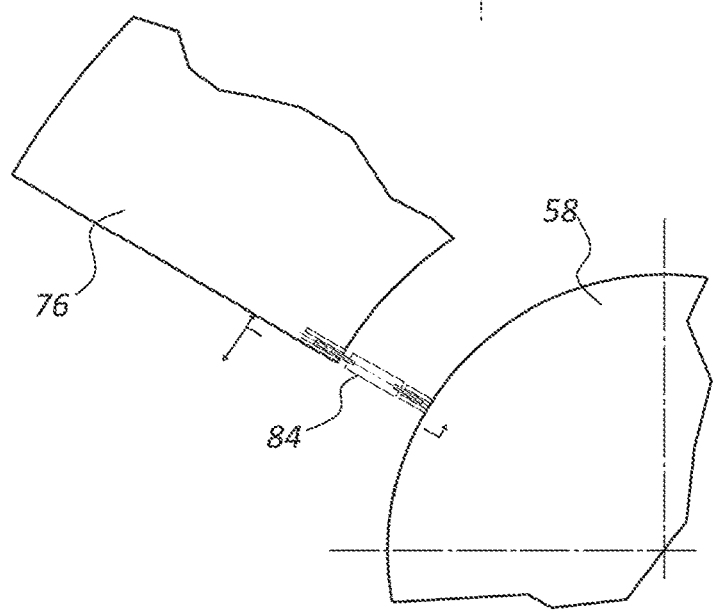
FIG. 16
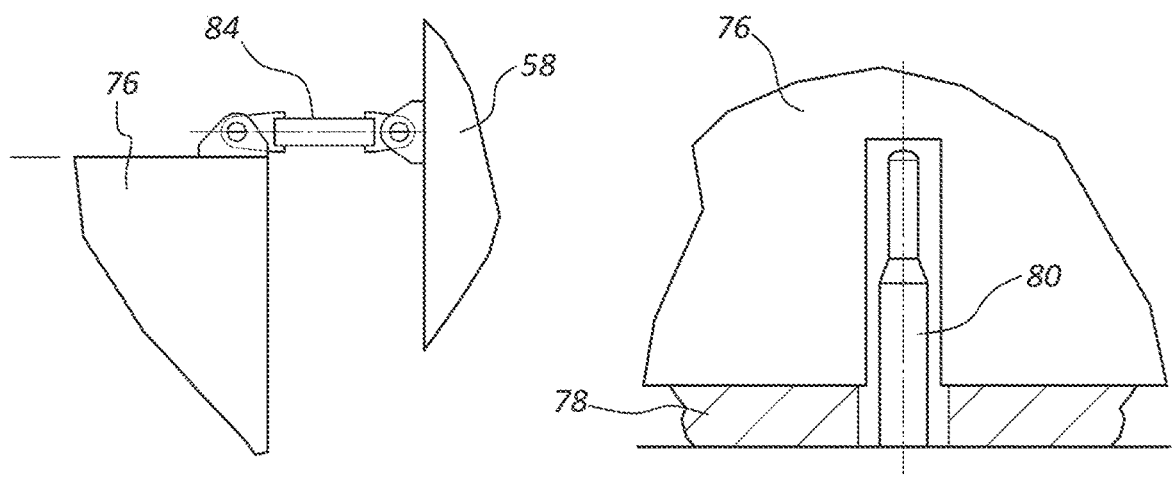
FIG. 17
FIG. 18

OFFSHORE FLOATING STRUCTURES

CROSS-REFERENCE TO RELATED PATENT APPLICATIONS

This claims the benefit of U.S. Provisional Pat. App. No. 62/409,437, titled "Tri-Column Floating Foundation with Vertically Tensioned Mooring for Offshore Wind Turbine and Method for Installation and Decommission," filed on 18 Oct. 2016, the entire contents of which are incorporated by reference into this document. In the event of a conflict, the subject matter explicitly recited or shown in this document controls over any subject matter incorporated by reference. The incorporated subject matter should not be used to limit or narrow the scope of the explicitly recited or depicted subject matter.

BACKGROUND

Offshore platforms and structures have been used for a variety of purposes over the years including recovery of natural resources such as oil and gas, wind power generation, and the like. The earliest structures were rigid and extended all the way to the ocean floor. As technology progressed, floating structures were developed that are suitable for use in deep water or hostile environments. Such structures included spar platforms, single column floater (SCF) platforms, tension leg platforms, and the like.

One application for floating offshore structures is wind turbines. Conventional floating wind turbines include a buoyant foundation that supports a tower with a nacelle at the top. The nacelle includes a rotor, electrical generator, and other mechanical and electrical equipment. The size of wind turbines has increased dramatically, in recent years they are very large structures with the body being 300-600 feet high and the rotor blades being 120-210 feet long.

One of the biggest expenses associated with offshore structures is installation and decommissioning. Conventionally, this is done in one of two ways. One way is to construct and assemble the structure onshore or near shore and then tow it to its offshore destination. This makes it easier and less costly to construct the structure because the necessary materials are readily available and accessible onshore.

The downside of this is that many common types of offshore structures cannot be fabricated onshore or near shore and/or cannot be towed from the construction site to the offshore destination due to a variety of limitations. For example, the structure may have a deep draft, which makes it difficult or impossible to tow through shallow water near the shore.

Another downside is that the structure must be designed to be satisfactorily stable at a much shallower draft than the design installed draft. Adequate stability requires larger columns/pontoons and/or wider column/pontoon spacing than would otherwise be required for the operation of the structure after installation. Using larger columns and/or placing them at wider intervals adds significant costs to the structure.

The other way to install an offshore structure is to transport the components of the structure to the offshore destination and assemble it there. This solves the problems associated with onshore fabrication but it creates several new problems. One of the biggest is that it is expensive to rent ships large enough to transport and assemble the structure offshore, especially when it involves assembling something as massive as a modern wind turbine. Another problem is that the assembly process is subject to weather conditions, which can cause expensive delays.

Conventional offshore floating structures also suffer from a number of additional problems besides those associated with construction, transportation, installation, and removal. For example, one problem is with the system used to hold the mooring line. Conventional systems are difficult to use and do not securely hold the mooring line. Another problem is hull stress caused by the mooring line repeatedly pushing and pulling on the hull.

These problems are especially acute when applied to offshore wind turbines. These structures can extend hundreds of feet in the air and experience high magnitudes of wind and wave loads. The industry currently lacks an improved hull design with unique technical features that simultaneously minimized hull motions, simplified and cost-effective installation and efficient decommissioning capabilities. Such are the capabilities of the technology described herein.

SUMMARY

Various embodiments of a floating structure are disclosed having certain combinations of features, characteristics, and advantages. The embodiment referred to most often is that of an offshore wind turbine. It should be understood, however, that the concepts can be used in connection with a variety of other floating structures such as a radio transmission tower, natural resource extraction platform, military bases, research/experimental stations, or the like.

The floating structure includes a hull and, optionally, a superstructure supported by the hull. The hull can have any suitable design and can be configured to support any suitable superstructure. In some embodiments, the floating structure includes an offshore wind turbine or floating wind turbine. In other embodiments, the floating structure includes an oil or natural gas extraction platform.

The floating structure can be stabilized during installation and decommissioning by installation aid structures (IASs). The IASs are temporarily coupled to the hull during these operations to provide increased water plane area and/or buoyancy to the floating structure. The IASs can be coupled to the hull at any suitable location, but they are preferably sited at locations that are distant from the center of the hull to provide a greater amount of stability.

The floating structure can include a chain engaging system configured to securely hold a mooring line. The mooring line includes, at least in part, a mooring chain. The chain engaging system locks the mooring chain to prevent it from moving lengthwise.

The floating structure can also include a mooring fixture pivotally coupled to the hull. The mooring fixture is where the mooring line is coupled to the floating structure. Configuring the mooring fixture to pivot relative to the hull helps reduce shock loads on the hull that can occur due to strong winds and/or wave action.

The chain engaging system can be part of the mooring fixture. A chain tensioning mechanism can be coupled to the IASs and used to tension the mooring line. For example, the chain tensioning mechanism can be used to pull the mooring chain to the desired tension. Once the mooring chain reaches the desired tension, the chain engaging system can be locked to hold the mooring chain in position. The IASs and the chain tensioning mechanisms can be removed (preferably together) and used to install/decommission another floating structure.

In one embodiment, the floating structure is an offshore wind turbine and the hull is specifically designed to support the tower and other components of a wind turbine. For example, the hull can include vertical support columns coupled together using horizontal pontoons. A tower base is supported in the center of the columns by trusses. The tower base is configured to receive and hold the tower of a wind turbine.

The Summary is provided to introduce a selection of concepts in a simplified form that are further described below in the Detailed Description. The Summary and the Background are not intended to identify key concepts or essential aspects of the disclosed subject matter, nor should they be used to constrict or limit the scope of the claims. For example, the scope of the claims should not be limited based on whether the recited subject matter includes any or all aspects noted in the Summary and/or addresses any of the issues noted in the Background.

DRAWINGS

The preferred and other embodiments are disclosed in association with the accompanying drawings in which:

FIG. 15 is a plan view of one embodiment of installation guides coupled to a support column. The installation guides are used to guide and hold the installation aid structure in position relative to the support column.

FIG. 16 is a plan view of one embodiment of a fastener used to couple the top of the installation aid structure to the support column.

FIG. 17 is a side view of the fastener in FIG. 16.

FIG. 18 is one embodiment of a support member extending upward from a pontoon into a recess in the underside of the installation aid structure to hold the installation aid structure in place.

DETAILED DESCRIPTION

Numerous embodiments of a floating structure (also referred to as a floating marine structure or offshore structure) are disclosed. The floating structure can be used in a wide variety of applications. Suitable applications include floating wind turbines (also referred to as offshore wind turbines), floating or offshore communication towers, floating or offshore natural resource extraction platforms, and the like.

The floating structures can be constructed, transported, installed, and/or removed with the assistance of one or more installation aid structures (IASs) (alternatively referred to as installation aid modules or temporary stability modules). The IASs are used to increase stability and/or buoyancy of the floating structure during these operations and removed when they are not needed. For example, the IASs can be installed onshore or near shore before the floating structure is towed to the installation site. After the floating structure has been successfully towed into position, moored, and placed in-service, the IASs can be removed and used with another floating structure.

It should be noted that the "installation aid structure" includes the word "installation" because it is most commonly used during installation and not because its use is limited to only installation. Accordingly, it should be appreciated that this term refers to aid structures used during installation and at other times such as removal/decommissioning of the floating structure.

The design of the floating structure and the use of the IASs increases or enhances the economical, efficient, and safe construction, transportation, installation, and removal of floating structures such as offshore wind turbines. The floating structure is designed to have enhanced strength and durability while also being simple and low cost. This combination of features and advantages reduces the cost of floating structures such as floating wind turbines, which results in increased adoption and use.

In some embodiments, the floating structure can be a tension leg platform (TLP). A TLP is a buoyant structure held in place by a mooring system. TLPs are like fixed platforms except the TLP is maintained in position by moorings held in tension by the buoyancy of the hull. The mooring system is a set of tension legs or tendons attached to the floating structure and moored to the seafloor using, for example, a template or foundation positioned on the seafloor. TLPs constrains vertical motion of the floating structure, but allow horizontal movement.

Figure 1:
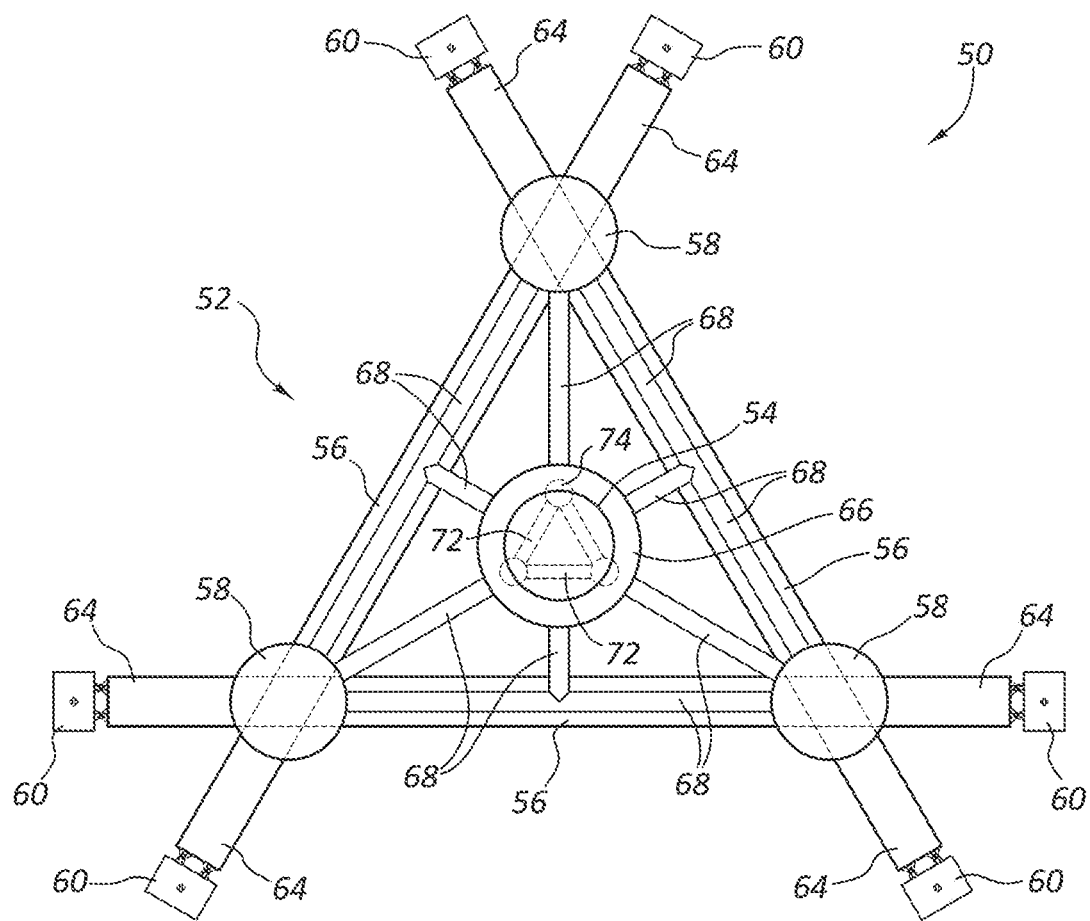
FIG. 1 is a plan view of one embodiment of a floating wind turbine having six mooring fixtures. The floating wind turbine is shown after it has been installed and is in service condition.
Figure 2:
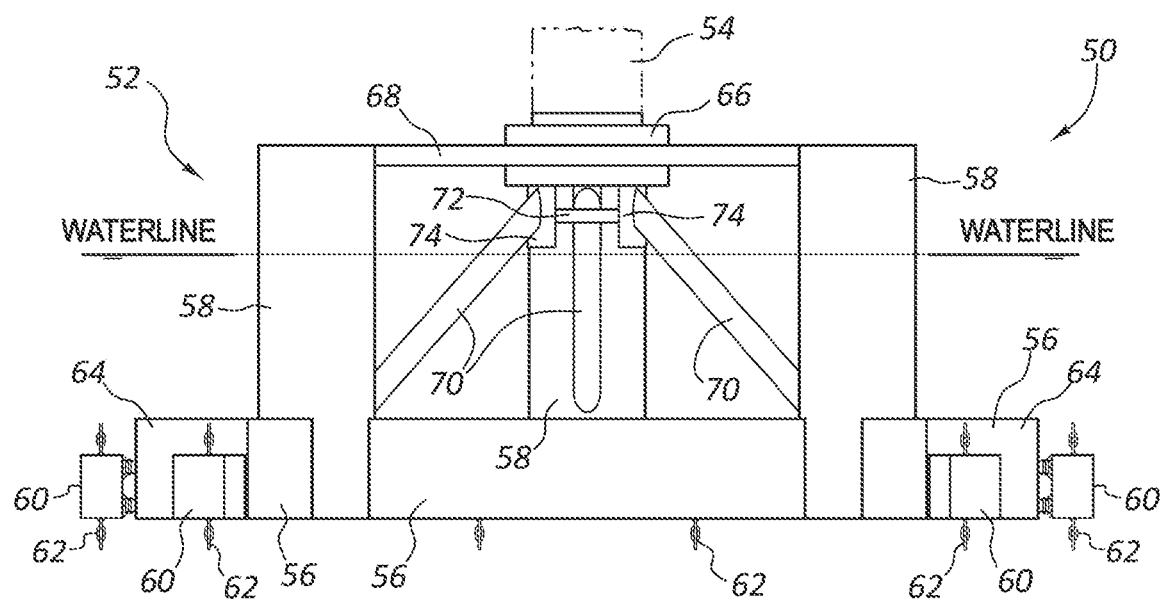
FIG. 2 is a side view of the floating wind turbine in FIG. 1.

FIGS. 1-2 show one embodiment of a floating structure 50 in the form of a floating wind turbine. The floating structure 50 includes a hull 52 or main body 52 and a wind turbine superstructure coupled to the hull 52. The superstructure can a tower 54, a nacelle supported by the tower 54, and a rotor and rotor blades. The floating structure 50 is especially well suited for use with the large modern wind turbines currently being constructed. The floating structure 50 provides the desired stability and strength for such wind turbines at a relatively low cost.

The tower 54 is designed to carry the weight of the nacelle, rotor, and rotor blades as well as absorb the static loads caused by the wind. The tower 54 can be made of any suitable material in any suitable configuration. For example, in some embodiments, the tower 54 can be constructed of steel, steel alloys, aluminum, or the like. Also, the tower 54 can have any suitable shape such as a circular column, lattice, or the like.

The nacelle holds the wind turbine's machinery. The nacelle is usually coupled to the tower 54 with bearings to allow it to rotate and follow the direction of the wind. The nacelle can include various components such as the rotor shaft and bearings, transmission, generator, coupling and brake, and the like. The transmission converts the relatively slow rotor motion into higher rpms for the generator.

The rotor and rotor blades work together to convert the wind into rotary mechanical movement. The rotor blades have a profile similar to that of an airplane wing and operate on the same principle of lift—i.e., on the lower side of the wing the passing air generates higher pressure, while the upper side generates a pull. These forces cause the rotor to move forwards and rotate. The rotor blades can be made of any suitable material such as fiberglass, carbon fiber reinforced plastics, and the like.

The hull 52 includes three pontoons 56 coupled to three support columns 58. The pontoons 56 are oriented horizontally and extend between the support columns 58. Each pontoon 56 is coupled to two support columns 58 so that the pontoons 56 and the support columns 58 combine to give the hull 52 a roughly triangular shape as shown in FIG. 1. The pontoons 56 extend outward past the support columns 58 to provide additional stability to the floating structure 50 and to provide mooring locations.

This design allows the hull 52 to be easily optimized to the conditions of a given installation site. For example, the wave scatter diagram for the installation site combined with the properties of the specific floating structure 50 can be used to optimize the first mode eigen-frequencies of the floating structure 50 below a certain value to avoid wave induced fatigue. Also, the natural periods of heave and roll/pitch can be monitored and tuned to avoid resonant responses by the moorings and the floating structure 50. This may be particularly suitable for those embodiments where the floating structure 50 is vertically tensioned such as TLP structure.

The properties of the hull 52 can be optimized in a variety of ways. For example, in some embodiments, the properties of the hull 52 can be optimized by adjusting the length/dimensions of the pontoons 56 and/or the spacing of the support columns 58. This makes the hull 52 particularly suited to achieve the goals of being robust yet cost effective.

FIGS. 1-2 show the floating structure 50 after it has been installed and is in-service condition. As shown in FIG. 2, the pontoons 56 are below the waterline and the support columns 58 extend upward from the pontoons 56 above the waterline. The hull 52 supports the tower 54 above the waterline.

It should be appreciated that the pontoons 56 and the support columns 58 can be coupled together in any suitable manner. For example, in some embodiments, the pontoons 56 extend through the support columns 58 as discrete components. The support columns 58 surround and/or enclose the pontoons 56 in the area where they are joined. In some other embodiments, the pontoons 56 do not extent through the support columns 58. Instead, the support columns 58 effectively split the pontoons 56 into separate pieces even though conceptually they can still be considered a single pontoon 56. Numerous other configurations are possible as well.

The pontoons 56 and/or the support columns 58 can have a variety of configurations. In some embodiments, the pontoons 56 and/or the support columns 58 are substantially hollow, watertight structures that provide buoyancy to the floating structure 50. In some embodiments, the pontoons 56 and/or the support columns 58 include floodable compartments for ballasting and deballasting and/or buoyant compartments for buoyancy. The floodable compartments make it possible to adjust the draft of the floating structure 50 by adjusting the degree of flooding in the compartments.

In some embodiments, the pontoons 56 and/or the support columns 58 include only buoyancy compartments and have no ballasting capabilities. In these embodiments, the pontoons 56 and/or the support columns 58 are pre-configured to provide the desired amount of buoyancy for the floating structure 50. Ballasting operations can be performed using the IASs described later. These embodiments have the advantage of being simple to make, relatively robust, and easy to install and maintain.

In other embodiments, the pontoons 56 and/or the support columns 58 include both buoyancy compartments and floodable compartments. In these embodiments, the pontoons 56 and/or the support columns 58 can be used to provide a predetermined amount of buoyancy to the floating structure 50 and to ballast the floating structure 50. All of the buoyancy requirements of the floating structure 50 and ballasting requirements can be provided by the pontoons 56 and/or the support columns 58.

In other embodiments, the pontoons 56 and/or the support columns 58 can include only floodable compartments. In these embodiments, the pontoons 56 and/or the support columns 58 use only the floodable compartments to provide both buoyancy and ballasting capabilities to the floating structure 50. It should be appreciated that the pontoons 56 and/or the support columns 58 can have numerous other configurations and be modified in many ways.

It should be appreciated that the pontoons 56 and the support columns 58 can have any desired shape and be made of a variety of materials. For example, the pontoons 56 and/or the support columns 58 can be cylindrical, polygonal (e.g., triangular, rectangular, pentagonal, hexagonal, etc.), or the like. Also, the pontoons 56 and/or the support columns 58 can be made of metal, plastics, and/or composites. For example, in some embodiments, the pontoons 56 and/or the support columns 58 can be constructed of steel, aluminum, or other metal alloy that is resistant to corrosion in a marine environment. In other embodiments, the pontoons 56 and/or the support columns 58 can be constructed of plastic, carbon fiber, and/or composites. The pontoons 56 and/or the support columns 58 can also be reinforced internally or externally by cross-members, braces, or the like.

Although the hull 52, is shown having three pontoons 56 and three support columns 58 in FIG. 1-2, it should be appreciated that the hull 52 can include any number of pontoons 56 and/or support columns 58 arranged in any suitable way. For example, in some embodiments, the hull 52 can includes three, four, or more pontoons 56 and three, four, or more support columns 58. One embodiment can include four pontoons 56 and four support columns 58 arranged in a rectangular or square shape. Numerous other embodiments are possible.

As shown in FIG. 1, the floating structure 50 also includes a plurality of mooring fixtures 60 (also referred to as mooring support porches) coupled to the hull 52. The mooring fixtures 60 are the components of the floating structure 50 that are coupled to mooring lines 62 to hold the floating structure 50 in position. The mooring fixtures 60 are coupled to opposing ends 64 of the pontoons 56, which puts them as far away from the center of the floating structure 50 as possible. Positioning the mooring fixtures 60 this way provides increased stability to the floating structure 50.

Figure 3:
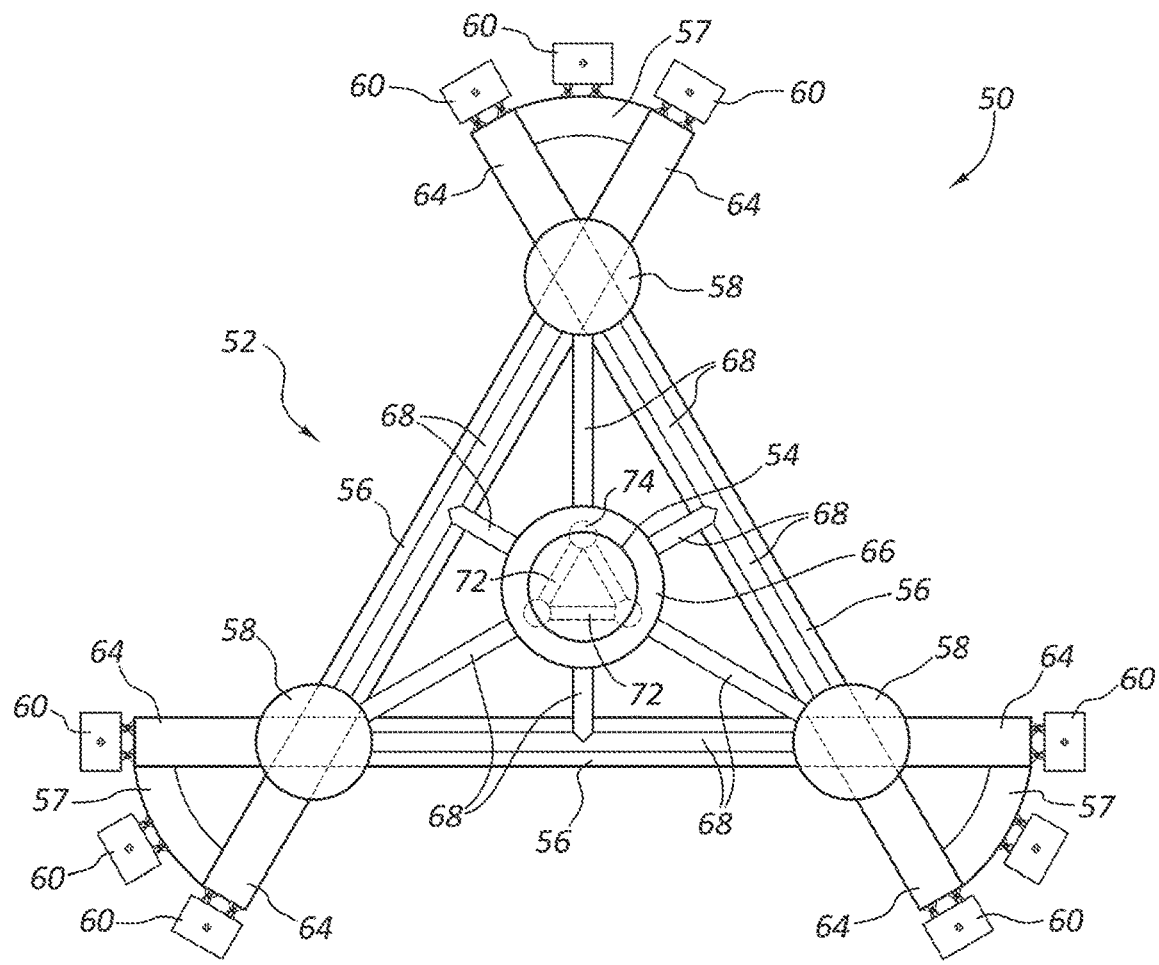
FIG. 3 is a plan view of one embodiment of a floating wind turbine having nine mooring fixtures. The floating wind turbine is shown after it has been installed and is in service condition.
Figure 4:
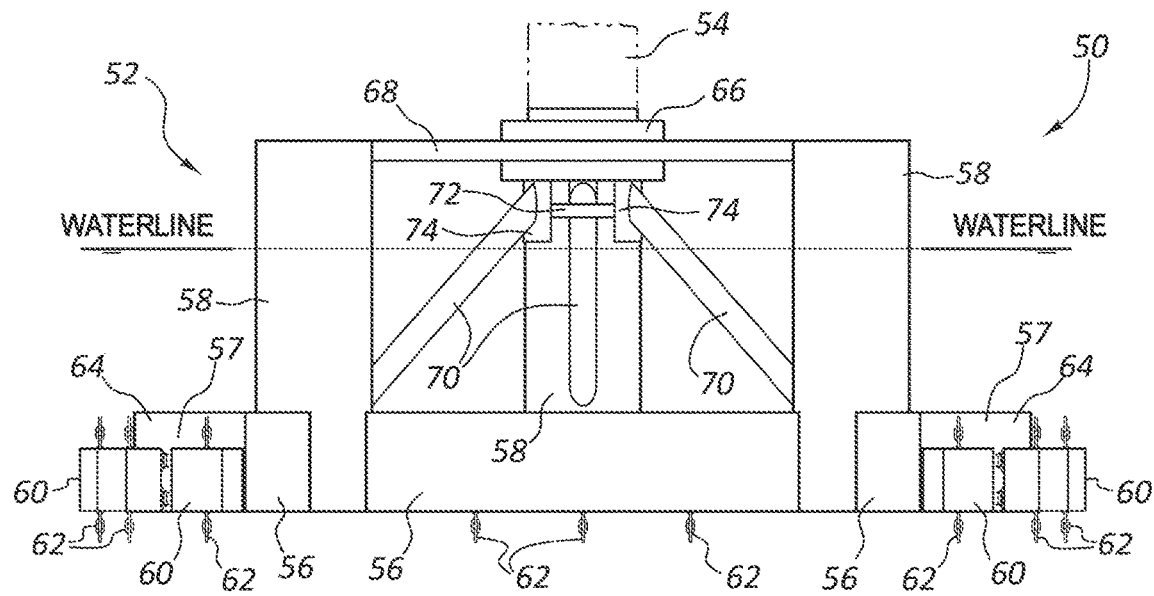
FIG. 4 is a side view of the floating wind turbine in FIG. 3.
Figure 5:
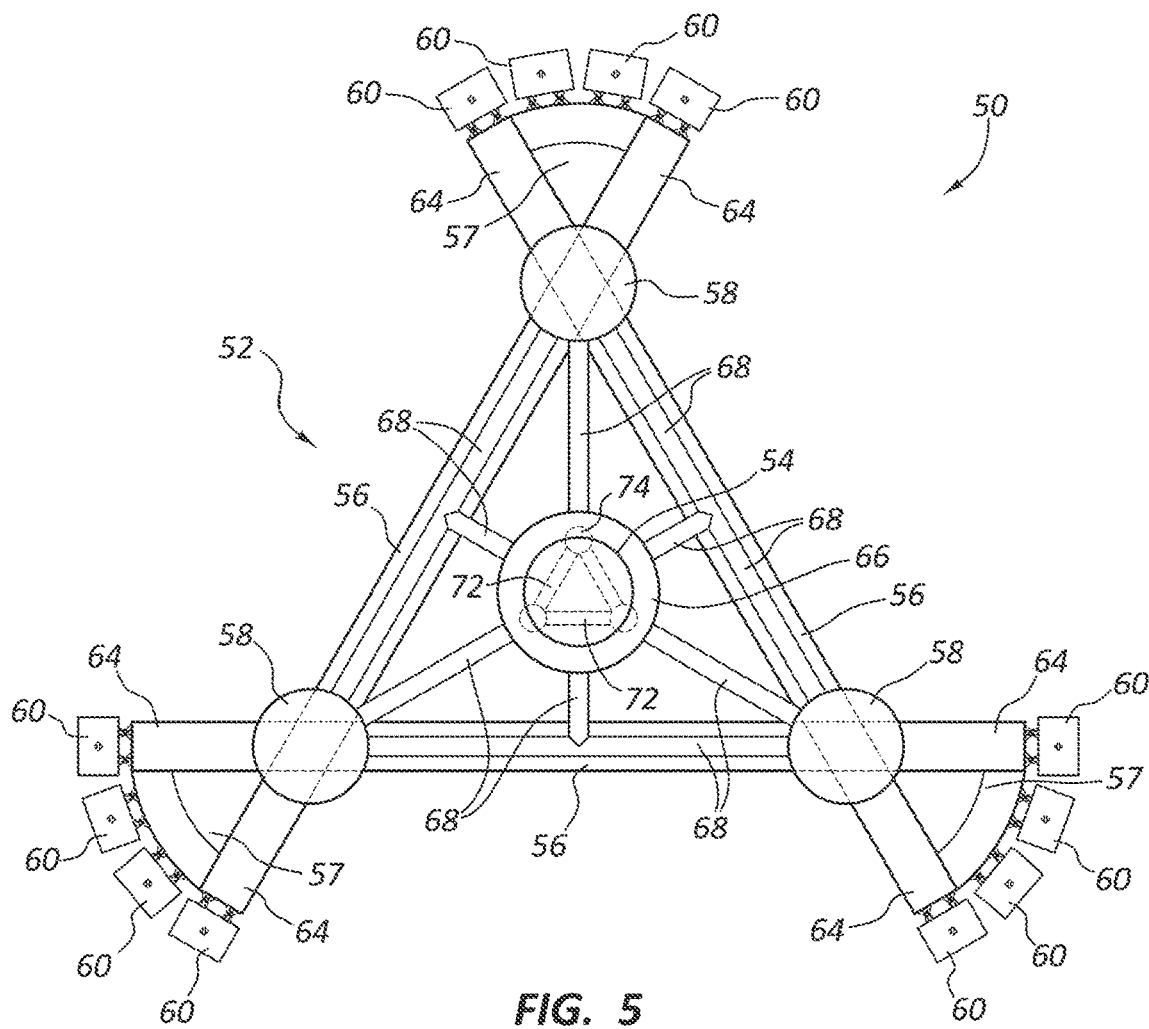
FIG. 5 is a plan view of one embodiment of a floating wind turbine having twelve mooring fixtures. The floating wind turbine is shown after it has been installed and is in service condition.
Figure 6:
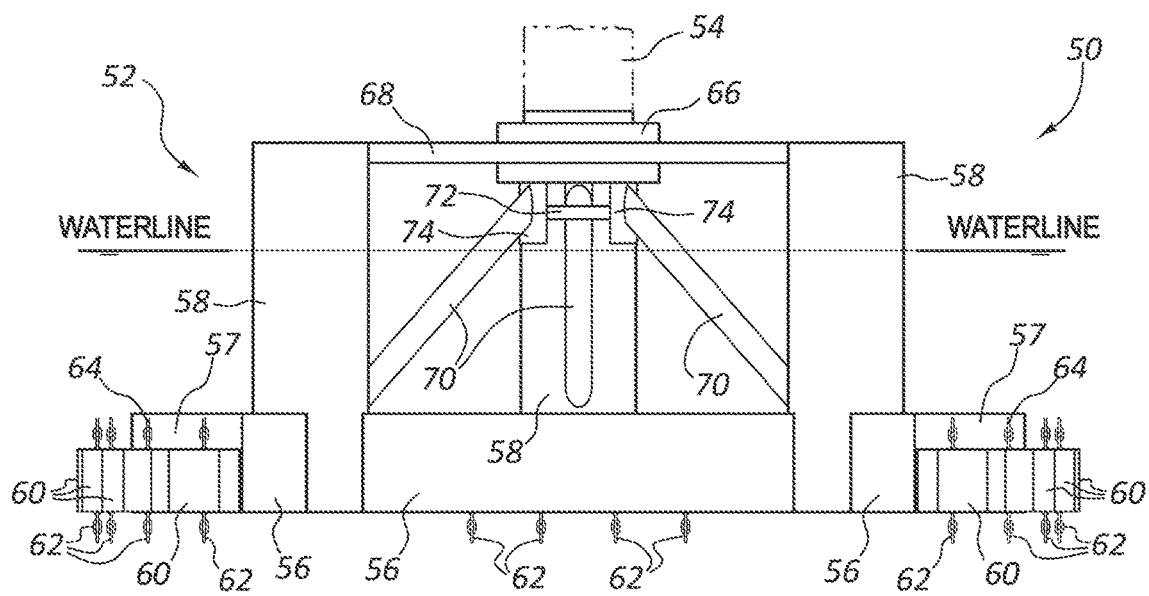
FIG. 6 is a side view of the floating wind turbine in FIG. 5.

The floating structure 50 shown in FIGS. 1-2 includes six mooring fixtures 60. It should be appreciated, however, that the floating structure 50 can include more or fewer mooring fixtures 60 than what is shown in FIGS. 1-2. For example, FIGS. 3-4 show another embodiment of a floating structure 50 having nine mooring fixtures 60, and FIGS. 5-6 show another embodiment of a floating structure 50 having twelve mooring fixtures 60. Any number of mooring fixture 60 can be used. For example, the floating structures 50 can include 2-20 mooring fixtures 60. It should be noted that the hull 52 includes additional pontoons 57 positioned between the ends 64 of the pontoons 56 to provide mounting locations for the additional mooring fixtures 60.

The number of mooring fixtures 60 may depend on the depth of the water and/or the condition of the seabed. For example, more mooring fixtures 60 may be desirable when the floating structure 50 is installed in relatively deep water or in locations that have poor seabed soil conditions.

The mooring fixtures 60 can be coupled to the hull 52 in any suitable manner. In some embodiments, the mooring fixtures 60 can be coupled to the hull 52 in a manner that allows the mooring fixtures 60 to rotate or pivot relative to the hull 52. This makes it so the mooring fixtures 60 can absorb some of the shock loads that would otherwise be transferred directly to the hull 52 thereby reducing stress, strain, and wear on the hull 52.

The mooring fixtures 60 can be coupled to the hull 52 using any suitable fasteners 91 and/or fastening methods including any of those disclosed in this document. In some embodiments, the mooring fixtures 60 are coupled to the hull 52 using one or more swivel or pivot brackets as shown in FIGS. 19-24. In general, it is desirable for the fasteners to allow a relatively small amount of movement that requires a substantial amount of force. Otherwise, the mooring fixtures 60 would be yanked around within the specified rotation limits.

The embodiments shown in FIGS. 19-24 use four swivel brackets to couple each mooring fixture 60 to the end 64 of the pontoon 56. The use of four swivel brackets makes it so the mooring fixture 60 does not move too easily relative to the pontoon 56 but still moves nonetheless. It should be appreciated that other embodiments can use more or fewer swivel brackets.

The hull 52 includes a tower base 66 configured to receive and hold the tower 54. The tower base 66 is positioned centrally relative to the support columns 58 and supported by a plurality of trusses or support members extending from the support columns 58 to the tower base 66. The trusses include horizontal trusses 68 extending from the top of the support columns 58 to the tower base 66 and slanted trusses 70 extending upward from a location near the bottom of the support columns 58 to the tower base 66. The trusses also include horizontal trusses 72 and vertical trusses 74 coupled to the trusses 68, 70 adjacent to the tower base 66.

Referring to FIG. 1, the horizontal trusses 68 and the tower base 66 combine to form a rigid, strong support base for the tower 54. The horizontal trusses 68 are arranged in a triangle shape with the tower base 66 positioned in the middle. The trusses 68 that form the sides of the triangle are intersected by transverse trusses 68 that extend from the side of the triangle to the tower base 66 at right angles. This design provides the hull 52 with increased strength to withstand the loads from the tower 54.

The slanted trusses 70 combined with the horizontal trusses 72 and vertical trusses 74 serve to further strengthen the hull 52. It should be appreciated that the trusses 68, 70, 72, 74 can have any suitable configuration and be made of any number of materials. For example, in some embodiments, the trusses 68, 70, 72, 74 can be made of lightweight, rigid, durable material such as steel, aluminum, carbon fiber, and the like. The trusses 68, 70, 72, 74 can be solid or hollow beams or rods having various cross-sectional shapes such as circular, square, and the like.

Figure 7:
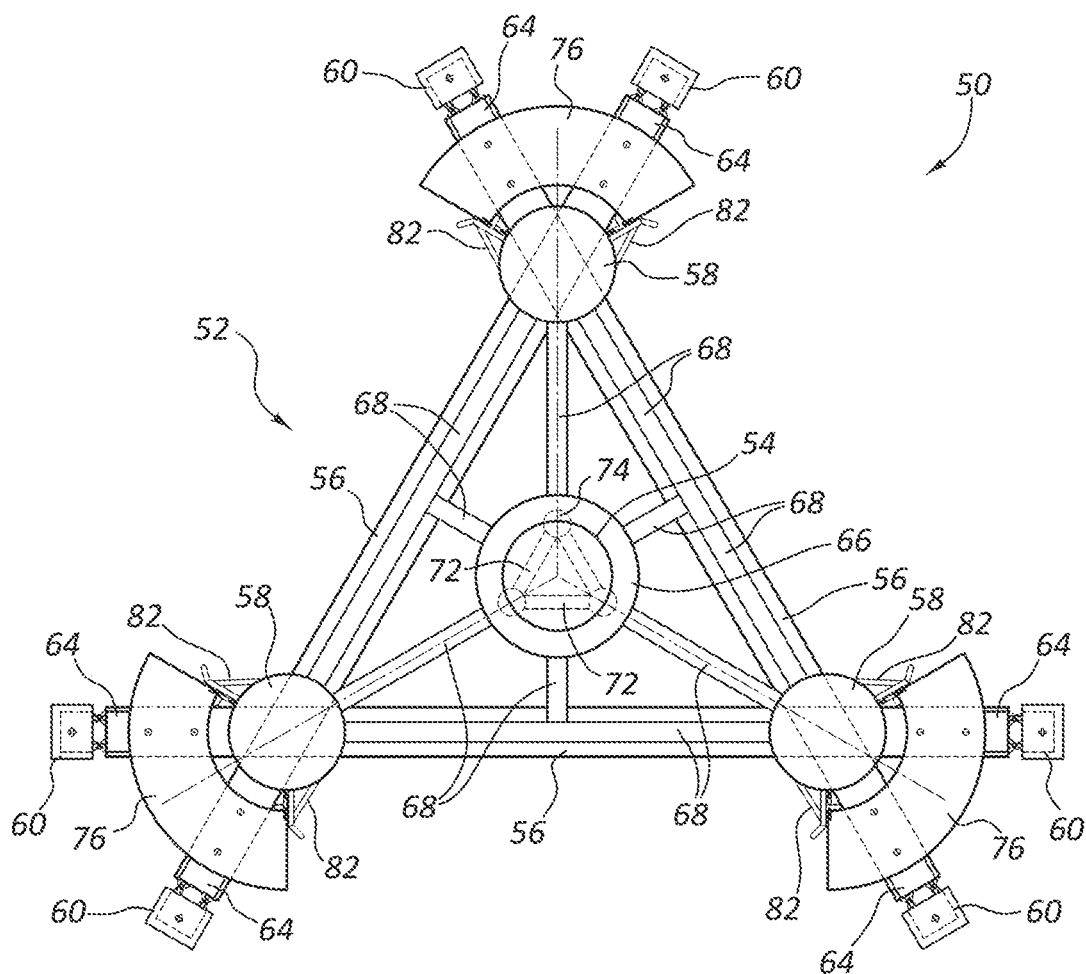
FIG. 7 is a plan view of the floating wind turbine in FIG. 1 during installation. Installation aid structures are shown coupled to the hull of the floating wind turbine.
Figure 8:
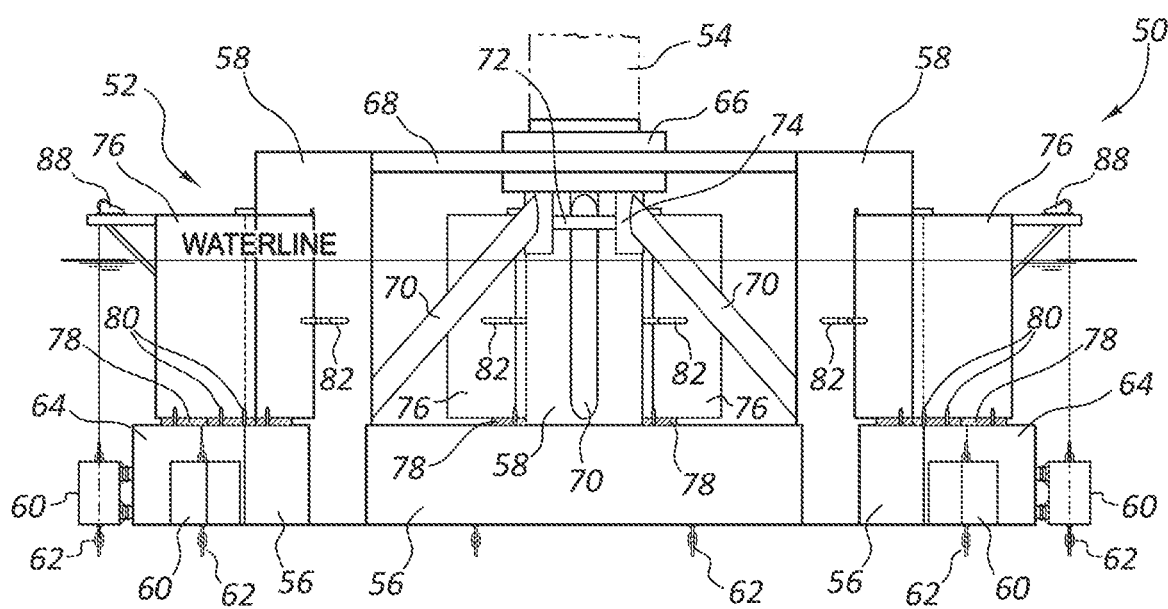
FIG. 8 is a side view of the floating wind turbine in FIG. 7.

FIGS. 7-8 show the floating structure 50 during installation. A plurality of IASs 76 are coupled to the hull 52 and ballasted to lower the draft of the hull 52 relative to that shown in FIGS. 1-2. The installation process is described in greater detail below.

The IASs 76 can be coupled to the hull 52 of the floating structure 50 at any suitable time during the construction, transportation, installation, and/or removal processes. For example, the IASs 76 can be coupled to the hull 52 during construction of the floating structure 50 at one or several convenient on-shore or near shore fabrication sites. The IASs 76 can be coupled to the hull 52 before or during transportation of the floating structure 50 by conventional methods such as ocean towing to the installation site. The IASs 76 can also be coupled to the hull 52 during installation of the floating structure 50, including when the structure 50 is moored at the site using mooring lines—e.g., tendons, catenary moorings, taut-line moorings, and the like.

The IASs 76 help keep the floating structure 50 in the intended stable upright vertical position during construction, towing to the destination site, and installation. The IASs 76 also help keep the floating structure 50 upright during removal after it has reached its end of life. The IASs 76 can be removed and later reattached to the floating structure 50. The IASs 76 provide an economical and safe method to modify the water plane area of the floating structure 50 to facilitate efficient, stable and continuously upright construction, transportation, and installation/decommission of the floating structure 50.

It should be appreciated that the IASs 76 can have any desired shape and can be made of a variety of materials. For example, the IASs 76 or portions of the IASs 76 can be rigid, semi-rigid, or flexible. Also, the IASs 76 can include floodable compartments for ballasting and deballasting and/or buoyant compartments for buoyancy. The ballast and buoyancy of the IASs 76 can be adjusted depending on the degree of flooding.

Although the IASs 76 are shown in connection with the floating wind turbine in FIGS. 8-12, the IASs 76 can be coupled to and used with any floating structures including, without limitation, main platforms, ancillary platforms, decks, equipment, and other facilities. The IASs 76 can be used to maintain the structure in an upright position during construction, transportation, installation and/or removal by increasing the area moment of inertia at the water plane and/or by moving the center of gravity toward the base of the floating structure 50.

The IASs 76 make it possible to construct the floating structure 50 in its final upright orientation or configuration, transport it to the installation site while it is upright, install it while it is upright, and moor it while it is upright. Some floating structures are unstable when the superstructure is in place. For such structures, the IASs 76 can provide temporary righting stability so that the upright orientation is preferred over the upside-down orientation.

The IASs 76 can be constructed in many alternate forms. In some embodiments, the IASs 76 are constructed using traditional, low-cost, metal fabrication methods and is generally built as a substantially hollow, watertight container of steel, aluminum or similar metal or alloy or mixtures or combinations thereof. In some other embodiments, the IASs 76 are constructed of a substantially hollow, watertight container of a high impact resistant plastic or a fiber reinforced resin composite or mixtures or combinations thereof. In some other embodiments, the IASs 76 are stiffened, internally reinforced, or braced by cross-members, braces, or the like. In general, the IASs 76 can be constructed out of metals, plastics, and/or composites.

In some embodiments, the IASs 76 can be made of or include substantially solid shapes made of a low-density solid or semi-solid material (e.g. foam), or inflatable bags used in offshore salvage operations. One advantage of these IASs 76 is that they cannot be punctured and flood, which would destroy their buoyancy. The solid, low-density materials can be placed inside a protective container or coated with high impact resistant materials such as metals or resin based composites, to provide protection and durability. The IASs 76 can be subject to less stringent design and material requirements because it is a temporary device that is removed after the floating structure is installed.

One or more of the IASs 76 can be temporarily coupled to the floating structure 50 to enhance the stability of the floating structure 50 by increasing its water plane area. This can be accomplished by positioning the IASs 76 so that at least a portion of the IASs 76 extends above the waterline. Increasing the area at the waterline or water plane causes a proportional increase in the area moment of inertia at the water plane.

The stability of the floating structure 50 can be determined by or is at least related to the relationship of its center of gravity, its center of buoyancy, and its area moment of inertia at the water plane, that is, the surface area and arrangement of all structure components at the water line. The area moment of inertia of the floating structure 50 can be increased by positioning the IASs 76 uniformly and/or symmetrically around the central vertical axis of the hull 52 and at a significant distance from the central vertical axis of the hull 52.

The IASs 76 can be coupled to the floating structure 50 and have sufficient area and height so that the meta-center of the combined system (floating structure 50 plus IASs 76) is always maintained above the center of gravity. The metacenter and meta centric height are as commonly used and understood in naval architecture. The IASs 76 can be positioned, sized, and shaped to ensure that the floating structure 50 has adequate stability—i.e., positive meta centric height as the structure is ballasted and lowered in the water. The IASs 76 modify the transverse and longitudinal stability such that tilting of the floating structure 50 around its vertical axis is minimized. The IASs 76 also increase the righting moment, which tends to restore the structure 50 to its stable configuration when the structure 50 is disturbed from this configuration such as through the action of waves, wind, or the like.

The IASs 76 can have any suitable arrangement. In general, the IASs 76 are arranged to provide the desired degree of stability for safe transportation, installation, and/or removal of the floating structure 50. In some embodiments, the IASs 76 can be ballasted during installation to change the floating structure 50 from a tow draft to a deeper installation draft without tilting the floating structure 50. The IASs 76 can supply some or all the entire ballast necessary to change the ballast state of the floating structure 50 or any portion thereof.

The IASs 76 can include valve and control devices that can be used for controlled flooding for ballasting operations. For example, the IASs 76 can be flooded to lower the draft of the floating structure 50 during the installation process so that mooring lines 62 can be attached. Once the mooring lines 62 are in place and tensioned, the water can be released from the IASs 76 to increase buoyancy and raise the floating structure 50 to its final tensioned draft. The ability to partially or fully flood the IASs 76 makes it possible to adjust the weight and/or buoyancy of the IASs 76 in a controlled manner and control the location of the center of buoyancy relative to the center of gravity of the floating structure 50, while increasing the area moment of inertia to the water plane.

The buoyancy of the IASs 76 can be adjusted in a variety of ways. For example, in some embodiments, water can be pumped into and out of the IASs 76 while simultaneously releasing or adding air or gas, respectively. This can be accomplished by manual adjustment of valves or similar openings or by automated, remotely controlled mechanisms to add water and/or air to change the relative buoyancy of the IASs 76. The IASs 76 can also include manual or remote controlled pumps or gas injectors.

Figure 9:
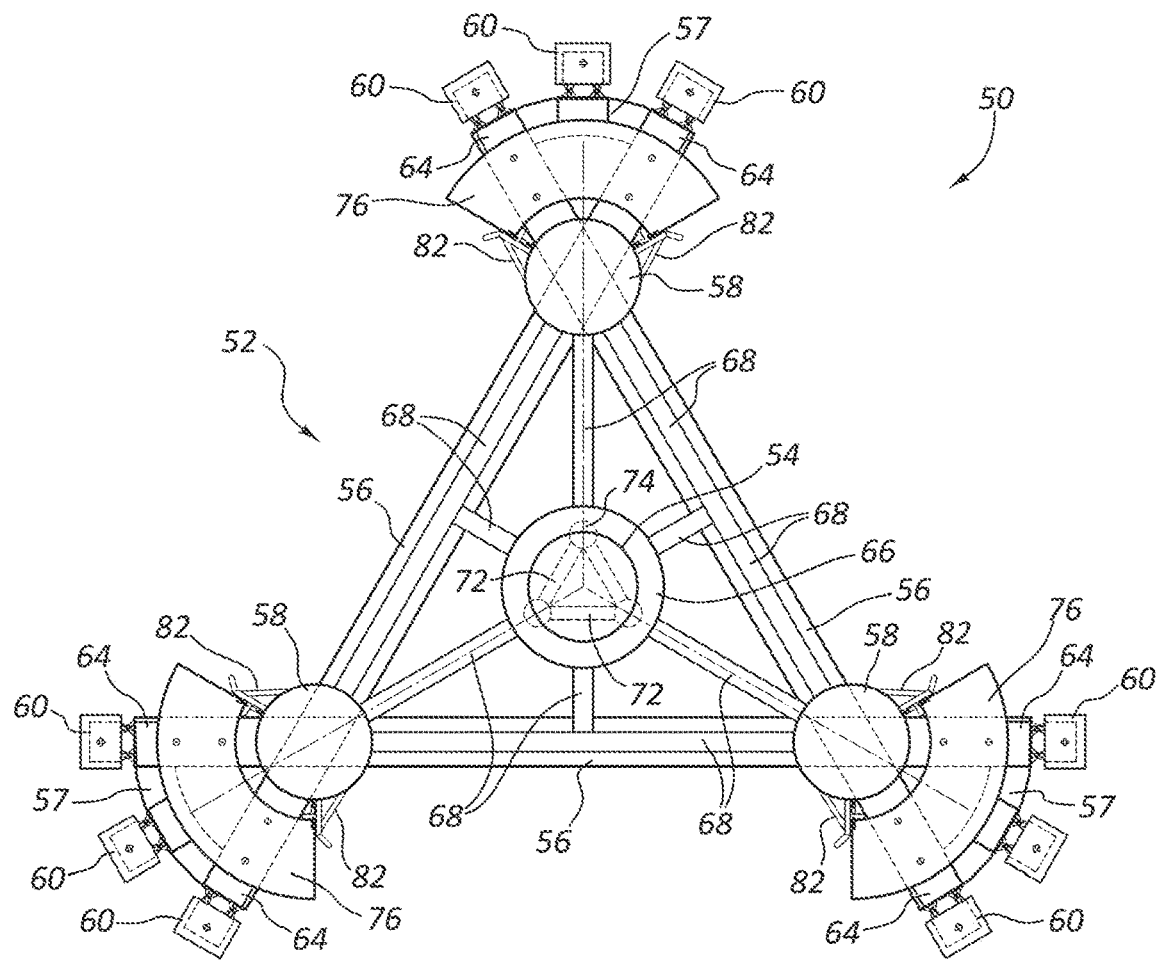
FIG. 9 is a plan view of the floating wind turbine in FIG. 3 during installation. Installation aid structures are shown coupled to the hull of the floating wind turbine.
Figure 11:
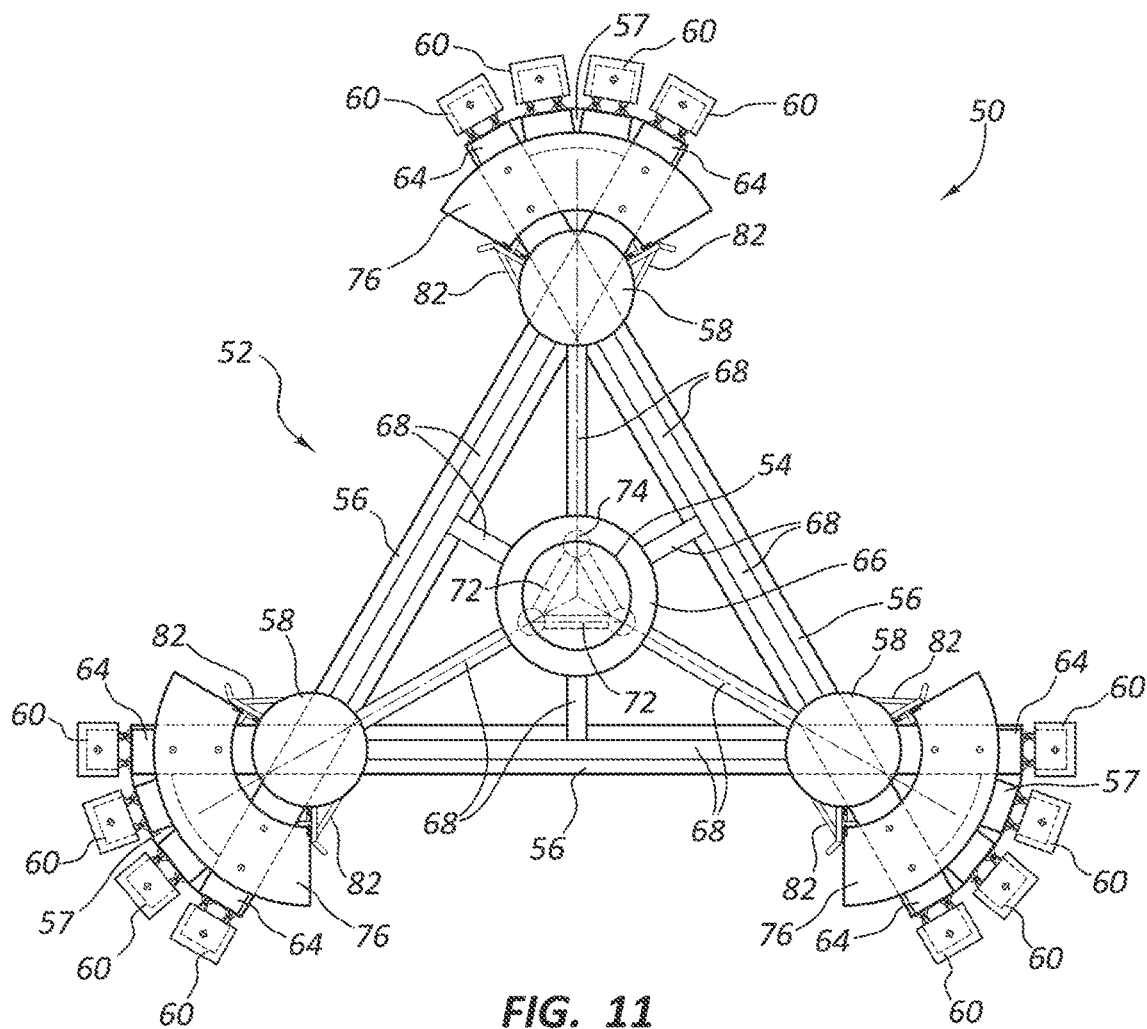
FIG. 11 is a plan view of the floating wind turbine in FIG. 5 during installation. Installation aid structures are shown coupled to the hull of the floating wind turbine.

In some embodiments, the IASs 76 are positioned as far from the center of the hull 52 (or center of the floating structure 50) as reasonably possible. For example, the IASs 76 can be positioned farther from the center of the hull 52 than the support columns 58, or, in other words, positioned on the outside of the support columns 58 as shown in FIGS. 7, 9, and 11. The IASs 76 can also have a roughly arched shape along a horizontal cross-section as shown in FIGS. 7, 9, and 11. This shape and position of the IASs 76 provides greater stability than other embodiments where the IASs 76 are closer to the center or have smaller water plane areas.

Figure 10:
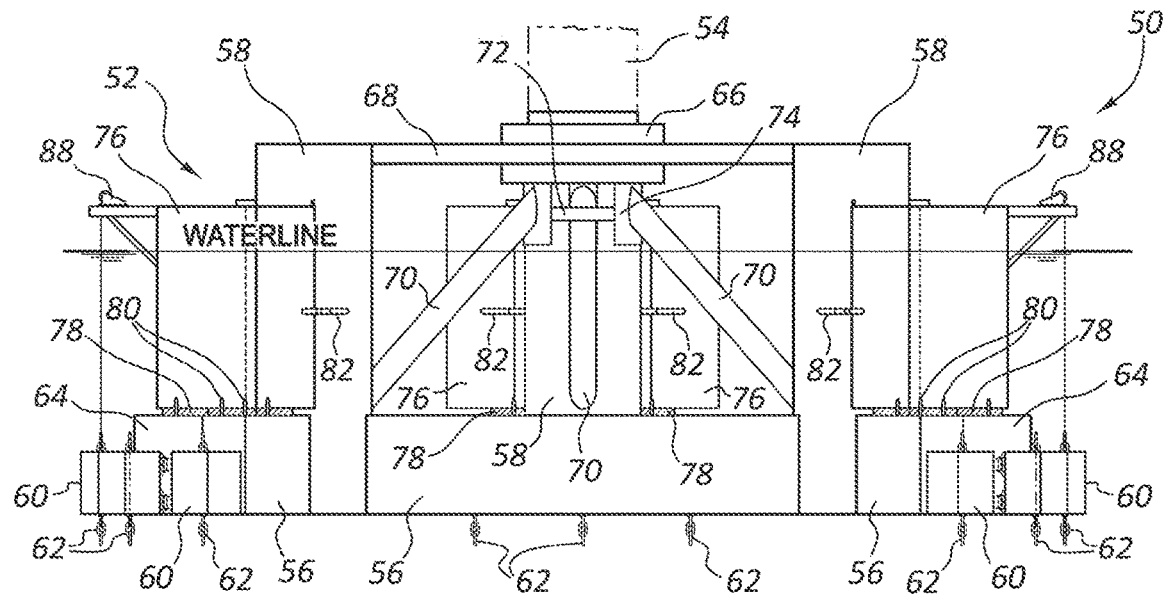
FIG. 10 is a side view of the floating wind turbine in FIG. 9.
Figure 12:
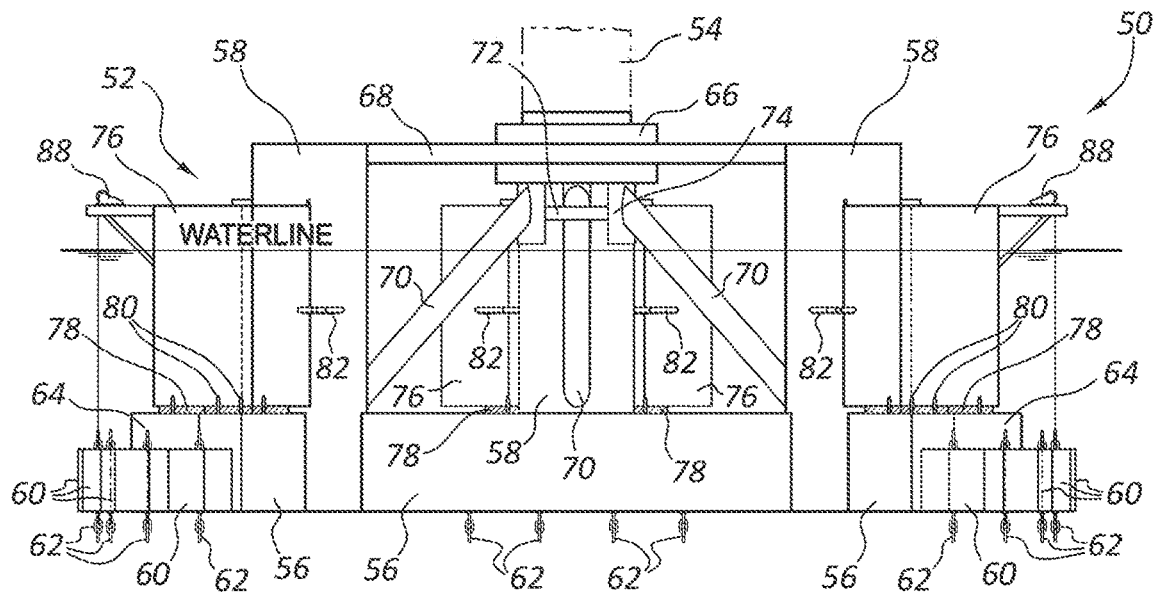
FIG. 12 is a side view of the floating wind turbine in FIG. 11.

The IASs 76 can be used with any of the embodiments of the floating structure 50 shown in the Figures. For example, the IASs 76 can be used with the floating structure 50 having nine mooring fixtures 60, as shown in FIGS. 9-10, or with the floating structure 50 having twelve mooring fixtures 60, as shown in FIGS. 11-12.

The IASs 76 can be coupled to the hull 52 of the floating structure 50 using any suitable method and/or fasteners. FIGS. 13-18 show some examples of ways the IASs 76 can be coupled to the hull 52. It should be appreciated that numerous other methods can be used.

Figure 13:
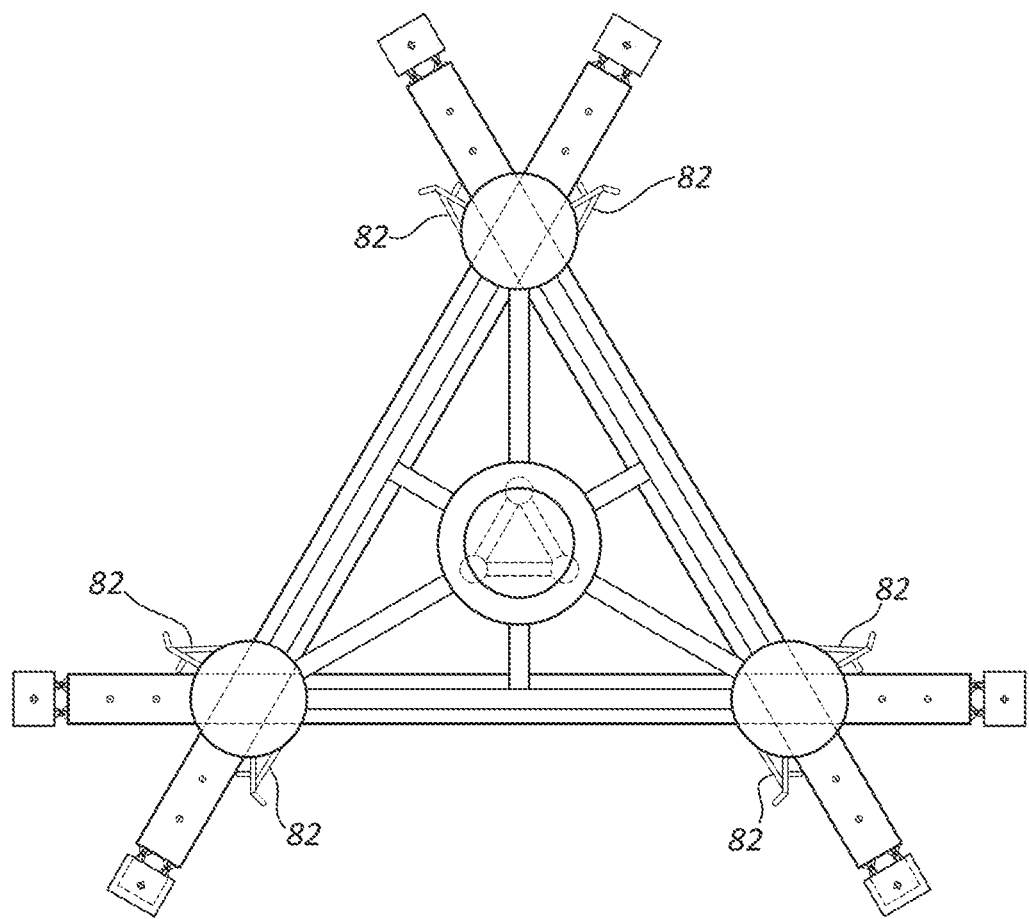
FIG. 13 is a plan view of the floating wind turbine in FIG. 1 configured and ready to have the installation aid structures coupled to the hull.
Figure 14:
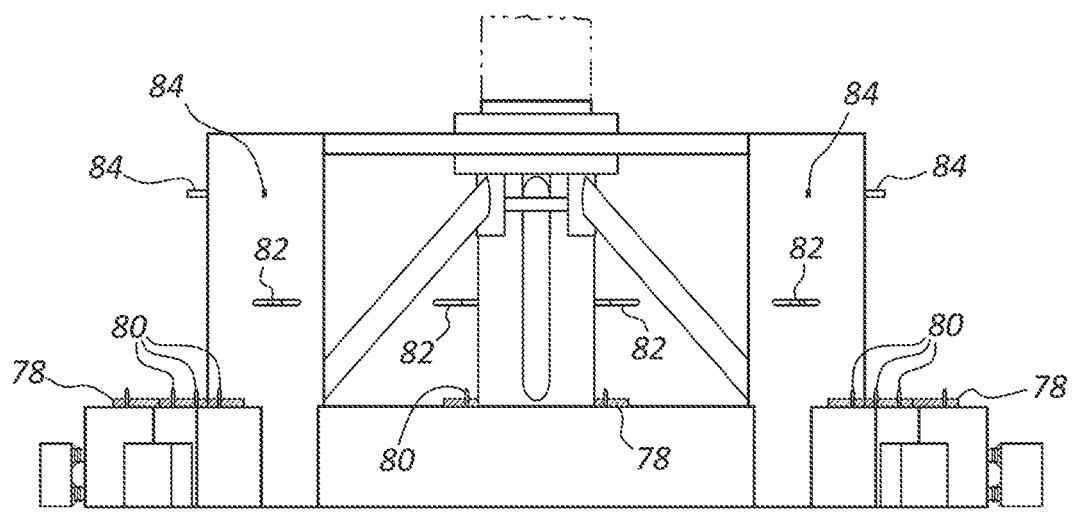
FIG. 14 is a side view of the floating wind turbine in FIG. 13.
Figure 19:
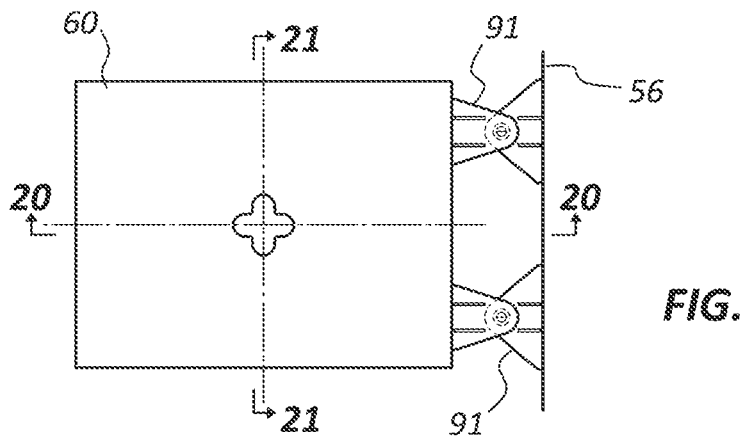
FIG. 19 is a plan view of a mooring fixture coupled to the hull. The mooring fixture includes a chain engaging system in an unlocked configuration.
Figure 20:
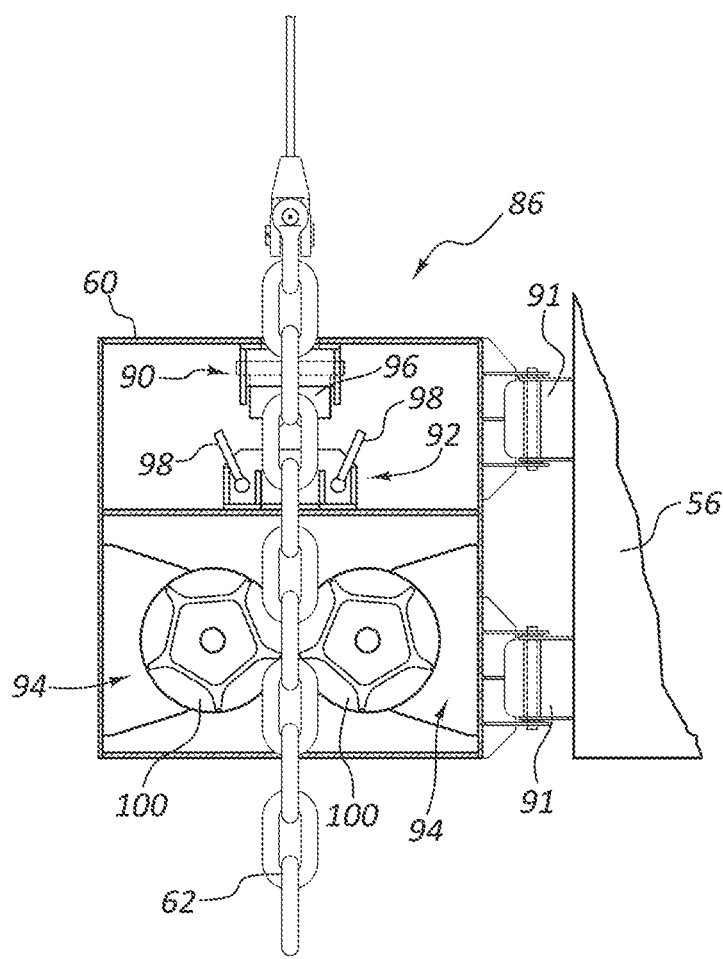
FIG. 20 is a cross-sectional side view of the mooring fixture along plane 20-20 in FIG. 19 It shows a chain engaging system inside the mooring fixture in an unlocked configuration.
Figure 21:
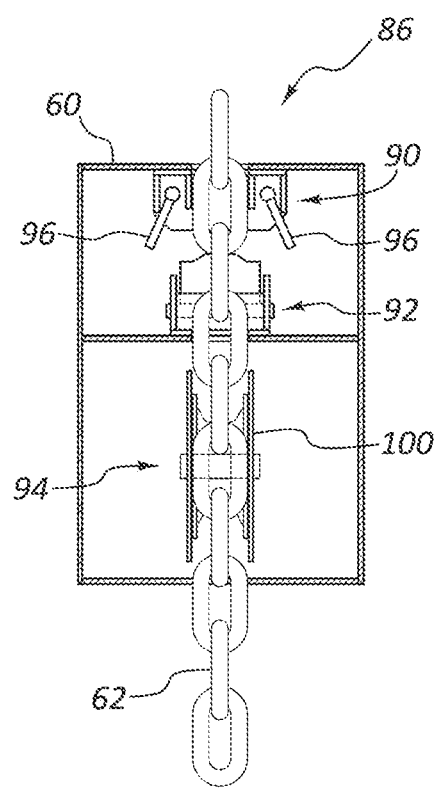
FIG. 21 is a cross-sectional side view of the mooring fixture along plane 21-21 in FIG. 19. It shows a chain engaging system inside the mooring fixture in an unlocked configuration.

Referring to FIGS. 13-14, the IASs 76 can be installed using cribbing 78 and installation guides 80, 82. The cribbing 78 is positioned between the pontoons 56 and the IASs 76 to provide some cushioning and/or give between the two components. The cribbing 78 can be made of any suitable material but is generally made of a softer, more forgiving material than the pontoons 56 and/or the IASs 76. Examples of suitable materials include wood, durable plastics, and the like.

The installation guides 80, 82 can be used to move and/or hold the IASs 76 in position. The installation guides 80, 82 can have any suitable configuration. For example, in some embodiments, the installation guides 80 are guide posts coupled to and extending upward from the pontoons 56 as shown in FIG. 18. The guide posts fit into recesses or holes in the underside of the IASs 76 to hold it in installed position. In some embodiments, the installation guides 82 are brackets that extend outward from the support columns 58 and guide the IASs 76 into position.

The installation guides 80, 82 can be coupled to the pontoons 56 and/or the support columns 58 using any suitable fastening method including any of those described in this document. For example, in some embodiments, the installation guides 80, 82 can be welded to the pontoons 56 and/or the support columns 58. This can be done onshore or by underwater divers at the installation site. The installation guides 80, 82 can be removed in a similar manner or left in place for later use.

The IASs 76 can be coupled to the hull 52 using any suitable type of fastener or fastening method including any of those described in this document. Examples of suitable fasteners and/or fastening methods include mechanical latches, pins, automatic or remotely operated couplings, manually operated couplings latches or pins, rivets or bolts. In some embodiments, the IASs 76 are coupled to the support columns 58 using fasteners 84, which can be, among other things, the pin connectors shown in FIGS. 16-17. In some embodiments, the fasteners 84 are configured to pivot relative to one or both the IAS 76 or the support column 58. In other embodiments, the fasteners 84 form a rigid connection between the IASs 76 and the support columns 58.

The IASs 76 can be coupled to the hull 52 in a way that prevents or minimizes wear or damage that may occur. For example, as mentioned above, the cribbing 78 can be used to prevent the IASs 76 from directly contacting the pontoons 56. Also, the IASs 76 can be configured to be spaced apart from the support columns 58 so that these components cannot wear against each other. The only connection between the IASs 76 and the support columns 58 are the installation guides 82 and the fasteners 84.

FIGS. 19-24 show one embodiment of a chain engaging system 86 (alternatively referred to as a chain lock system) used to hold the mooring line 62 in position. In those embodiments that use the chain engaging system 86, the mooring line 62 is made at least in part of a mooring chain 62 that the chain engaging system 86 engages. The mooring line 62 in the Figures is shown as a mooring chain 62.

The chain engaging system 86 securely locks the mooring chain 62 in position and prevents it from moving lengthwise in either direction. For example, the chain engaging system 86 prevents the mooring chain 62 from moving in a first direction relative to the chain engaging system 86 that decreases tension on the mooring chain 62. Likewise, the chain engaging system 86 prevents the mooring chain 62 from moving in a second direction relative to the chain engaging system 86 that increases tension on the mooring chain 62. In the embodiment, shown in the FIGS., the first direction corresponds to moving the mooring chain 62 upward through the chain engaging system 86, for example with a chain tensioning mechanism 88. The second direction corresponds to moving the mooring chain 62 downward through the chain engaging system 86.

The chain engaging system 86 includes a first or upper chain engaging mechanism 90 (alternatively referred to as a chain lock mechanism), a second or lower chain engaging mechanism 92 (alternatively referred to as a chain lock mechanism), and a chain alignment mechanism 94. The first chain engaging mechanism 90 is configured to prevent the mooring chain 62 from moving in the first direction, and the second chain engaging mechanism 92 is configured to prevent the mooring chain 62 from moving in the second direction. Together, the first and second chain engaging mechanisms 90, 92 securely hold the mooring chain 62 from moving lengthwise in either direction.

Figure 22:
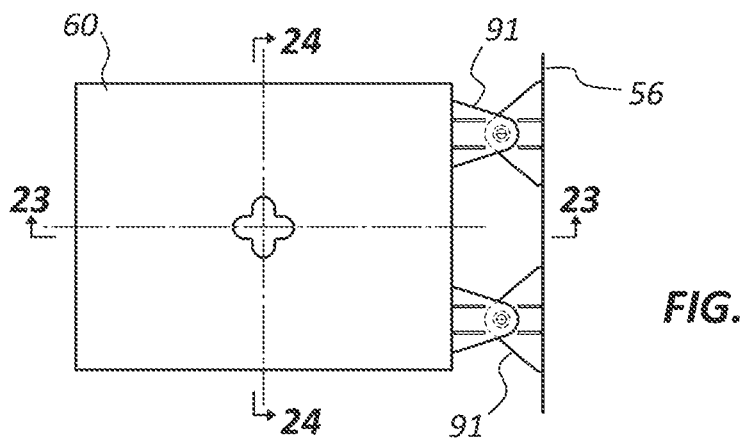
FIG. 22 is a plan view of a mooring fixture coupled to the hull. The mooring fixture includes a chain engaging system in a locked configuration.
Figure 23:
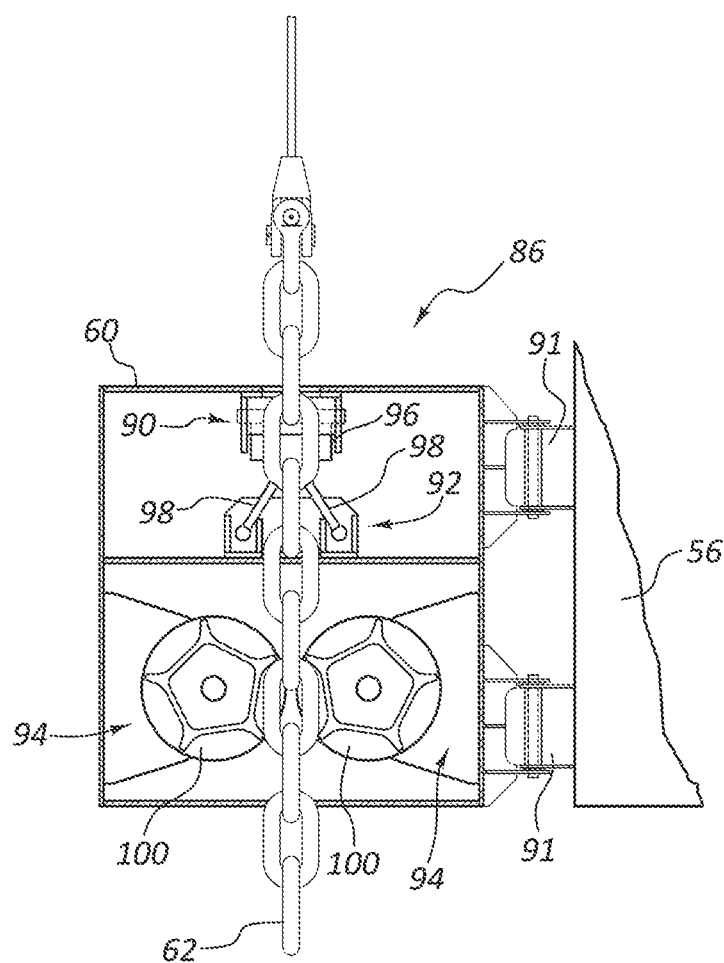
FIG. 23 is a cross-sectional side view of the mooring fixture along plane 23-23 in FIG. 19 It shows a chain engaging system inside the mooring fixture in a locked configuration.
Figure 24:
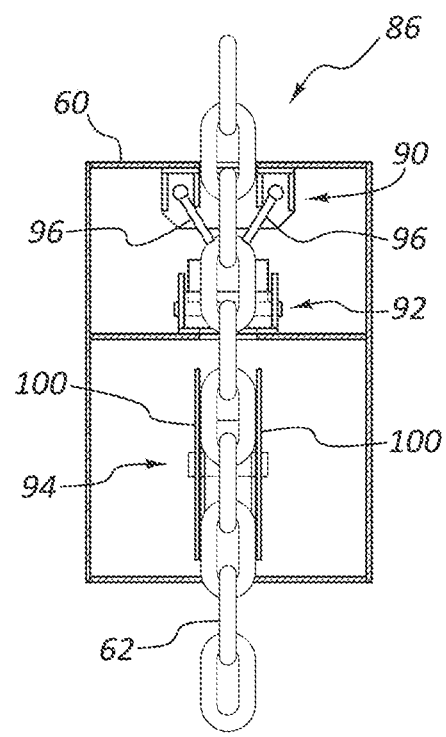
FIG. 24 is a cross-sectional side view of the mooring fixture along plane 24-24 in FIG. 19. It shows a chain engaging system inside the mooring fixture in a locked configuration.

The first chain engaging mechanism 90 includes first engaging members 96 that move between an unlocked position where the mooring chain 62 can move in the first direction (FIGS. 19-21) and a locked position where the mooring chain 62 cannot move in the first direction (FIGS. 22-24. Likewise, the second chain engaging mechanism 92 includes second engaging members 98 that move between an unlocked position where the mooring chain 62 can move in the second direction (FIGS. 19-21) and a locked position where the mooring chain 62 cannot move in the second direction (FIGS. 22-24).

The chain engaging mechanisms 90, 92 can use any suitable actuator or device to move the engaging members 96, 98 between the unlocked position and the locked position. Examples of suitable actuators include hydraulic actuators, electric actuators, and the like. The lock members 96, 98 can also be moved manually or by other means.

Referring to FIGS. 23-24, when the chain engaging mechanisms 90, 92 are in the locked position, the engaging members 96 engage the top of one chain link and bias it downward and the engaging members 98 engage the bottom of an adjacent chain link and bias it upward. In this manner, the engaging members 96, 98 bias adjacent interlocked chain links in opposite directions, which makes the two chain links taut. This arrangement makes it impossible for the mooring chain 62 to move lengthwise in either direction and forms a solid, rigid lock.

The chain alignment mechanism 94 is used to orient the chain links perpendicular to each other before they pass through the chain engaging mechanisms 90, 92. This helps prevent the mooring chain 62 from binding in the chain engaging mechanisms 90, 92. The chain alignment mechanism 94 can have any suitable configuration. In one embodiment, it includes a plurality of chain pulleys 100 through which the mooring chain 62 passes. The chain pulleys 100 have indentations that correspond to the shape of the chain links. As the mooring chain 62 passes between the chain pulleys 100, the links are made to be perpendicular to each other.

It should be appreciated that the chain engaging system 86 differs from conventional winches and/or windlasses in many ways. For example, conventional winches/windlasses do not affirmatively prevent the mooring chain 62 from moving lengthwise in both directions because they do not prevent the mooring chain 62 from moving towards the windlass and becoming loose—e.g., the cylinder of the winch/windlass remains stationary and the mooring chain 62 moves over the cylinder causing the mooring chain 62 to loosen around cylinder.

The chain tensioning mechanism 88 can be any suitable device capable of tensioning the mooring line 62. For example, in some embodiments, the chain tensioning mechanism 88 includes a winch that wraps the mooring line 62 around a cylinder. The chain tensioning mechanism 88 can be positioned in any suitable location. In some embodiments, the chain tensioning mechanism 88 is coupled to the top of the IASs 76 as shown in FIGS. 8, 10, and 12. In these embodiments, the chain tensioning mechanism 88 can be moved and transported with the IASs 76. In some embodiments, the chain tensioning mechanism 88 is coupled to the top of the pontoons 56. In some embodiments, multiple chain tensioning mechanisms 88 can be coupled to the top of the IASs 76 to tension the mooring chains in multiple mooring fixtures 60.

The floating structure 50 can be transported, installed, and removed using any suitable method. One example of a process for transporting and installing the floating structure 50 includes the following steps. First, the IASs 76 are coupled to the floating structure 50 in the manner shown in FIGS. 13-18. The IASs 76 can be accomplished by pre-ballasting the IASs 76 to a neutral buoyant condition, positioning them correctly relative to the hull 52 using the installation guides 80, 82, and fastening them to the hull 52 using fasteners 84.

Second, the floating structure 50 is towed to the installation site. Third, the floating structure 50 is ballasted down to an installation draft. Fourth, the mooring lines 62 are coupled to the mooring fixtures 60, pre-tensioned the desired amount and locked in position by the chain engaging system 86. Fifth, the floating structure 50 is deballasted and allowed to rise until it reaches the design draft. Sixth, the IASs 76 are removed from the floating structure 50. The IASs 76 can be reused for multiple installations.

It should be appreciated that numerous changes can be made to this process. For example, additional steps and/or details can be added or steps can be removed. For example, in some embodiments, the mooring line 62 is pre-tensioned to 20%-40% of its final tension using the chain tensioning mechanism 88.

In some embodiments, the floating structure 50 can be lowered in the water to a deeper draft or raised to a shallower draft by controlled adjustment of the ballast of only the floating structure 50 with no change in the buoyancy of the IASs 76. In other embodiments, the floating structure 50 can be lowered or raised to a different draft by controlling the ballast of the IASs 76 only and without changing the ballast of the floating structure 50. In fact, the floating structure 50 can be configured without any ballasting compartments with the IASs 76 supplying all the ballasting. In some embodiments, the ballast of the floating structure 50 and the IASs 76 can be controlled separately or together to produce the desired draft.

One example of a process for removing the floating structure 50 includes reversing the process described above. It should be appreciated that the process can be modified in any number of ways.

It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another.

The term "coupled" also refers to joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Readily or easily releasable joining refers to joining that can be readily, easily, and/or promptly released with little or no difficulty or effort. Difficult or hard to release joining refers to joining that is difficult, hard, or arduous to release and/or requires substantial effort to release. The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the way the components are joined. A fastener is generally a separate component used in a mechanical fastening method to mechanically join the components together. A list of examples of fastening methods and/or fasteners are given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (Velcro), hook and eye fasteners, push pins, clips, clasps, clamps, zip ties, zippers, buttons, buckles, split pin fasteners, and/or conformat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on their specific configurations and/or applications. For example, rope, string, wire, cable, chain, and the like can be permanent, readily releasable, or difficult to release depending on the application.

It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure the term shall mean," etc.).

References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope.

The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be given their broadest interpretation in view of the prior art and the meaning of the claim terms.

As used herein, spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

All disclosed ranges are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% A in either direction) and provide support for claims that recite the range itself (e.g., 0 to 16), any subrange within the range (e.g., 2 to 12.5) or any individual value within that range (e.g., 15.2).

The invention claimed is:

1. A floating structure comprising a chain engaging system configured to hold a mooring chain in a fixed position and prevent any lengthwise movement of the mooring chain relative to the chain engaging system, wherein the chain engaging system holds the mooring chain in the fixed position by biasing adjacent interlocked links in the mooring chain in opposite directions.

2. The floating structure of claim 1 wherein the chain engaging system is configured to prevent movement of the mooring chain in a first direction relative to the chain engaging system that decreases tension on the mooring chain and prevent movement of the mooring chain in a second direction relative to the chain engaging system that increases tension on the mooring chain.

3. The floating structure of claim 2 wherein the chain engaging system comprises a first chain engaging mechanism configured to prevent movement of the mooring chain in the first direction and a second chain engaging mechanism configured to prevent movement of the mooring chain the second direction.

4. The floating structure of claim 1 wherein the adjacent interlocked links are oriented perpendicular to each other.

5. The floating structure of claim 1 wherein the chain engaging system holds the mooring chain in the fixed position by preventing a first link in the mooring chain from moving in a first direction and preventing a second link in the mooring chain that links to the first link from moving in a second direction that is opposite the first direction.

6. The floating structure of claim 5 wherein the chain engaging system comprises a first chain engaging mechanism configured to prevent the first link in the mooring chain from moving in the first direction and a second chain engaging mechanism configured to prevent the second link in the mooring chain from moving in the second direction.

7. The floating structure of claim 1 wherein the chain engaging system comprises:
a first engaging member and a second engaging member;
wherein the first engaging member rotates between a
locked position where the first engaging member prevents the mooring chain from moving in a first direction relative to the chain engaging system and an unlocked position where the first engaging member does not prevent the mooring chain from moving in the first direction;

wherein the second engaging member rotates between a locked position where the second engaging member prevents the mooring chain from moving in a second direction relative to the chain engaging system and an unlocked position where the second engaging member does not prevent the mooring chain from moving in the second direction; and wherein moving the mooring chain in the first direction decreases tension on the mooring chain and moving the mooring chain the second direction increases tension on the mooring chain.

8. The floating structure of claim 1 wherein the chain engaging system comprises a chain engaging mechanism and a chain pulley, wherein the chain pulley is configured to orient adjacent links in the mooring chain perpendicular to each other before the chain engaging mechanism receives the adjacent chain links.

9. The floating structure of claim 1 wherein the floating structure includes a wind turbine.

10. The floating structure of claim 1 comprising a hull having three support columns oriented vertically and three pontoons oriented horizontally, wherein each of the pontoons is coupled between two of the three support columns to form a triangular shape.

11. The floating structure of claim 1 wherein the mooring chain forms at least part of a mooring line.

12. A floating structure comprising
a hull comprising;
a support column; and
a pontoon coupled to the support column;
an installation aid structure coupled to the hull;
wherein the pontoon supports the installation aid structure; and
wherein the installation aid structure is roughly arched shape along a horizontal cross-section.

13. The floating structure of claim 12 wherein the installation aid structure is positioned farther away from the center of the hull than the support column.

14. The floating structure of claim 12 wherein a portion of the installation aid structure is positioned above a waterline.

* * * * *